United States Patent
Wright

[15] 3,673,437
[45] June 27, 1972

[54] DAMPED SINUSOIDAL CURRENT PULSE GENERATOR AND METHOD

[72] Inventor: Donald A. Wright, Woodbury, Minn.

[73] Assignee: Minnesota Mining and Manufacturing Company, Saint Paul, Minn.

[22] Filed: June 29, 1970

[21] Appl. No.: 50,840

[52] U.S. Cl...........................307/252 J, 328/223, 340/258 C
[51] Int. Cl...........................H03k 17/00
[58] Field of Search................328/65, 67, 213, 223; 324/34, 324/41; 307/252 N, 252 J, 108; 340/38 L, 258 C, 258 D; 194/100; 331/165, 166

[56] References Cited

UNITED STATES PATENTS

| | | | |
|---|---|---|---|
| 2,995,709 | 8/1961 | Beardwood et al. | 328/223 X |
| 3,015,783 | 1/1962 | Van Der Horst et al. | 328/223 X |
| 3,178,645 | 4/1965 | Schops | 328/223 X |
| 3,292,080 | 12/1966 | Trikilis | 340/258 D X |
| 3,299,424 | 1/1967 | Vinding | 340/258 C X |
| 3,423,674 | 1/1969 | Goldsmith et al. | 340/258 C X |
| 2,431,324 | 11/1947 | Grieg | 331/166 X |
| 3,049,626 | 8/1962 | Shannon | 328/223 X |
| 3,534,243 | 10/1970 | Kondo et al. | 331/166 X |

*Primary Examiner*—Stanley D. Miller, Jr.
*Attorney*—Kinney, Alexander, Sell, Steldt & Delahunt

[57] ABSTRACT

A damped sinusoidal electromagnetic field is produced by oscillatory current flow in a conductor of an inductive component of an underdamped LC resonant circuit. Energy is stored in the resonant circuit when the resonant circuit is coupled to a steady state D.C. electrical energy source by the triggering into conduction of an SCR connected in series with the resonant circuit and the D.C. source. Energy is transferred to the resonant circuit by an inductor connected in series therewith. The inductance of the inductor is sufficiently less than that of the inductive component of the resonant circuit such that sufficient energy is stored in the resonant circuit at a sufficient rate to cause current flow in the SCR to ultimately cease. Thereupon the SCR shuts off the transfer of energy from the D.C. source to the resonant circuit, and damped sinusoidal oscillation occurs in the resonant circuit to produce a damped sinusoidal electromagnetic field. The SCR is intermittently triggered into conduction to produce an intermittent series of damped sinusoidal electromagnetic fields.

7 Claims, 1 Drawing Figure

PATENTED JUN 27 1972 3,673,437
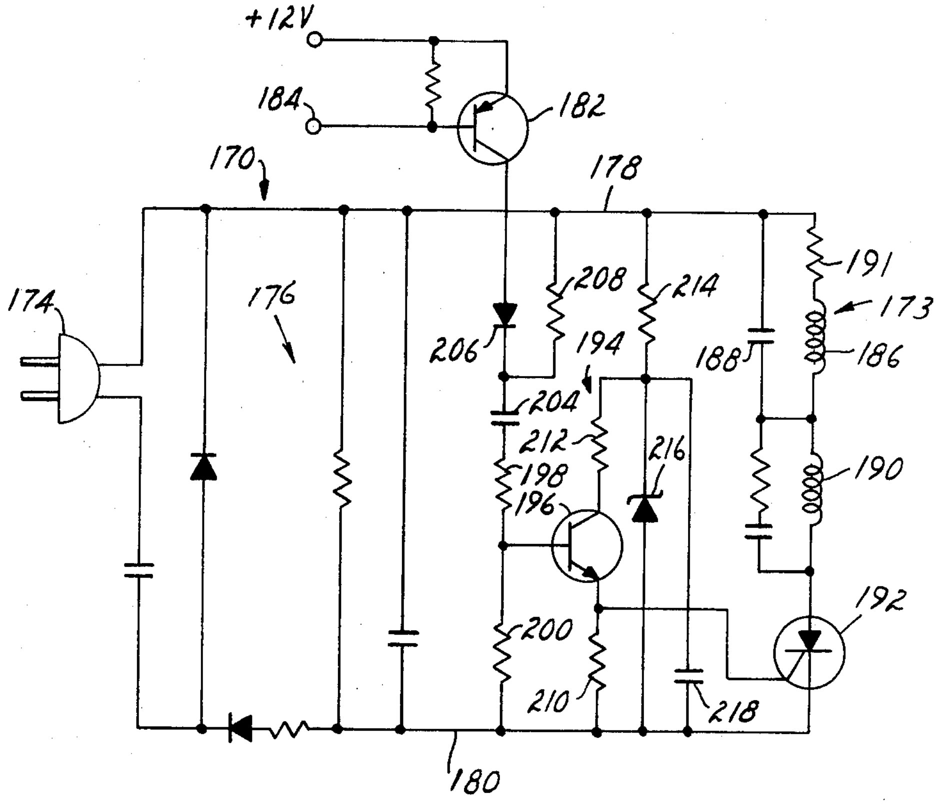
INVENTOR.
DONALD A. WRIGHT
BY Kinney, Alexander, Sell, Steldt & DeLaHunt
ATTORNEYS

DAMPED SINUSOIDAL CURRENT PULSE GENERATOR AND METHOD

RELATED APPLICATION

This application includes subject matter disclosed but not claimed in pending U.S. application, Ser. No. 885,874 filed jointly on Dec. 17, 1969, by James T. Elder and Donald A. Wright, the latter of which is the inventor of the present application. The related and this application are both assigned to the same assignee.

FIELD AND BACKGROUND OF THE INVENTION

This invention relates in general to electrical devices for producing electromagnetic fields by causing an alternating current to flow in a conductor. In a preferred utilization, the invention relates to electromagnetic field producing means of object detection systems in which each object to be detected is provided with a "responder." An alternating electromagnetic field for activating a responder is provided in an area, an interrogation zone, through which the object is to pass.

The responder comprises ferro-magnetic material. Upon entry of a responder into the field, the magnetization of the responder reverses at each alternation of the field, provided the responder receives sufficient energy from the field. Each magnetization reversal produces a characteristic signal which is sensed to detect the object. Typically, the amount of energy received by a responder depends not only on the intensity of the field but upon the orientation of the responder relative to the direction of the field as well.

Importantly, such systems must generally detect a responder with a high degree of dependability.

In the above referenced U.S. Patent application, Ser. No. 885,874 a highly dependable field producing system is disclosed which provides fields along several directions. The field peak intensities are selected such that a field-component sufficient to activate a responder is produced along nearly every direction. The fields are produced as a sequence of pulses, each pulse in the sequence having a different direction. It will be appreciated that the shorter the pulse, the shorter the sequence period and the higher the dependability of the system since more sequences can be produced in the time it would take a responder to pass through an interrogation zone.

In many applications, it is highly desirable that the responder be as small as possible. E.g., in an antipilferage application for protecting the books of a library, a responder is employed which is small enough to be concealed between two pages near the binding of a book. The signal produced by a magnetization reversal of such a responder is relatively small; indeed it is very small when compared to the field produced by the electromagnetic field producing means.

A pulse of magnetic field produced by known apparatus, such as a relay is characterized by large, relative to the size of a responder signal, amounts of "noise" during the time immediately following initiation of the pulse. Accordingly, use of such apparatus would require a pulse having a relatively large number of alternations, i.e., a relatively long duration pulse. And, to produce a damped pulse, such an apparatus would need to produce a pulse of relatively larger peak amplitude than would be required of a noise-free pulse.

SUMMARY OF THE INVENTION

Briefly, my invention is an electrical circuit for producing a damped sinusoidal electromagnetic field, preferably in an interrogation zone. It includes an underdamped parallel-resonant LC circuit, the inductive component of which comprises a conductor for producing the electromagnetic field. A silicon controlled rectifier (SCR) is provided for intermittently coupling a D.C. source of steady state electrical energy to the resonant circuit to transfer a predetermined amount of electrical energy to the resonant circuit. An inductor is connected in series with the SCR, the resonant circuit and the D.C. energy source for transferring energy to the resonant circuit to enable oscillation therein after the decoupling of the D.C. energy source from the resonant circuit. Upon decoupling of the energy source and resonant circuit, free oscillations dissipate the energy transferred to the resonant circuit as a damped sinusoidal current in the conductor which in turn produces a correspondingly damped sinusoidal electromagnetic field. It is possible to store the transferred energy in either the capacitive or inductive component of the resonant circuit. Where it is desired to store the energy in the inductive component, however, the time required to build up a sufficiently large current results in pulse times considerably longer than if the energy is stored in the capacitive component. In one embodiment of my invention, I provide a circuit which produces an alternating current, the first half-cycle of which produces an electromagnetic field capable of activating a responder to produce a detectable characteristic signal. By providing an appropriately selected inductor in series with the SCR and resonant circuit, no other means are required to turn the SCR off to decouple the energy source and resonant circuit. The inductance of the inductor is sufficiently less than that of the inductive component of the resonant circuit such that sufficient energy is stored in the resonant circuit at a sufficient rate to cause current flow in the SCR to ultimately cease. The conductor used to produce the electromagnetic field should have an inductance of at least 4.7 times the inductance of the inductor. Preferably it should have an inductance of from 4.7 to 25.0 times, and ideally should have an inductance of about 6.0 times the inductor inductance. I have found that if the ratio is less than 4.7 times, the SCR will fail to turn off.

In an embodiment invented by D. A. Benassi and claimed in his copending U.S. patent application the inductor is the primary winding and the resonant circuit inductive component is the secondary winding of a transformer. To insure efficient coupling between the windings, Benassi has found that the transformer can be an auto transformer. In yet another embodiment a resistor is coupled in series with the coupling means and resonant circuit instead of an inductor.

It will be appreciated by one skilled in the art that the amount of energy transferred to a resonant circuit can be determined by monitoring either the charge across the capacitive component or the current in the inductive component of the resonant circuit.

BRIEF DESCRIPTION OF DRAWING

A preferred embodiment which illustrates how to make and use my invention in conjunction with a field producing means such as those described in the previously referred to application, Ser. No. 885,874 shall now be described with reference to the appended drawing wherein:

The FIGURE is an electrical schematic diagram of a preferred embodiment of a circuit according to my invention.

DETAILED DESCRIPTION

It should be noted that for the embodiment of the drawing, energy transferred from the energy source is primarily stored in the capacitive rather than the inductive component of the resonant circuit. The capacitive component of the resonant circuit thus has dual functional roles, one in storing energy, and another in resonating with the inductive component to dissipate residual transferred energy as free oscillations.

In the drawing the field producing means is shown as the conductor of the inductive component 186 of a resonant circuit 173. Conveniently, an energy source section 170 may comprise a source of A. C. voltage 174 such as ordinary 117 volt line voltage and a conventional voltage doubler rectifier shown generally as 176. The voltage doubler 176 provides a steady state D. C. output potential of approximately zero and minus 200 volts, on leads 178 and 180 respectively.

The triggering means include a transistor 182 which is actuated or rendered conductive when a turn-on control signal is impressed on node 184. When transistor 182 conducts, an SCR 192 is enabled to pass a pulse of energy to the resonant circuit 173. A capacitor 188 stores a pulse of energy from the D.C. energy source 176 in response to conduction of transistor 182 and SCR 192 and, in its function as a component of a resonant circuit, resonates with the inductive component 186 of the resonant circuit. As a result, the capacitor passes the stored pulse to the field producing means as a damped pulse of energy. The circuit for charging capacitor 188 and subsequently causing transfer of this charge to field producing means 186 comprises inductor 190, a silicon controlled rectifier (SCR) 192, and a circuit, shown generally as 194, for triggering SCR 192. Trigger circuit 194 comprises normally nonconducting transistor 196 the base lead of which is coupled to one end of each of resistors 198 and 200. The other end of resistor 198 is also coupled in series with a blocking capacitor 204 and diode 206 to the collector of transistor 182. One plate of capacitor 204 and the cathode of diode 206 are also common to one lead of a resistor 208 the other lead of which is connected to the zero volt reference lead 178. Normally, with transistor 182 in a non-conducting state, the potential across capacitor 204 is about 200 volts and thus current to the base of transistor 196 is cut off, holding the transistor 196 in its normally non-conducting state. When transistor 182 conducts, capacitor 204 charges towards 212 volts and the charging current through capacitor 204 turns on transistor 196 until the potential across capacitor 204 reaches 212 volts. The remainder of trigger circuit 194 comprises the emitter and collector resistors, 210 and 212 respectively, of transistor 196, a capacitor charging network formed by resistor 214 and zener diode 216 and a capacitor 218. The gate lead of SCR 192 is common to the emitter of transistor 196 and its emitter resistor 210 so that, with both the other end of resistor 210 and the cathode lead of SCR 192 held at approximately minus 200 volts, the SCR will be rendered conductive or triggered only whenever transistor 196 conducts. Transistor 196 conducts when a pulse applied to node 184 forward biases transistor 182. Current flows from the emitter to collector of transistor 182, through diode 206, capacitor 204 and resistor 198 to turn on transistor 196. With transistor 196 on, capacitor 218 discharges through resistor 212 and transistor 196 to provide a pulse of current to the gate of SCR 192 thereby triggering the SCR into conduction. Upon conduction of SCR 192, current flows through capacitor 188, inductor 190 and SCR 192 to begin storage of energy in capacitor 188. To insure a sufficiently rapid storage, it has been found necessary to select the value of inductor 190 to be not more than 1/4.7 that of the inductance of the field producing means 186. In this way most of the current from capacitor 188 flows through inductor 190 rather than through inductor 186. When capacitor 188 is charged to approximately −200 volts the current in inductor 190 is at a maximum. This current continues to flow until the energy in inductor 190 is transferred to the resonant circuit 173, and as result capacitor 188 charges to a voltage of about −300 volts. This final voltage depends somewhat on the ratio of the inductances of inductors 186 and 190, and also on resistive losses in inductor 190 and other components through which the current passes. When the voltage across capacitor 188 has reached its peak and current has stopped flowing in inductor 190, SCR 192 stops conducting. Capacitor 188 now discharges into field-producing inductor 186, generating a characteristic damped sinusoid waveform of current within the coil 186. A resistor 191 of very small resistance is provided between one end of inductor 186 and the zero volt reference lead 178. The voltage developed across resistor 191 is exactly proportional to the current in inductor 186 and may thus conveniently be employed as a synchronizing signal for an object detection system. In such a system, a detector indicates the presence of a responder upon detection of a characteristic signal at a particular time specified relative to the time base of the electromagnetic field.

What is claimed is:

1. An electrical circuit for producing a damped sinusoidal electromagnetic field in an interrogation zone for activating a responder passing through the zone, comprising a resonant circuit adapted to receive electrical energy and including an inductive component and a capacitive component connected in parallel, the inductive component comprising a conductor for producing an electromagnetic field;

means for intermittently coupling a source of electrical energy to the resonant circuit to transfer a predetermined amount of electrical energy to the resonant circuit, the dissipation of residual transferred energy in the resonant circuit upon decoupling of the energy source and resonant circuit producing in the interrogation zone a damped sinusoidal electromagnetic field of sufficient intensity to activate a responder; and an inductor connected in series with the resonant circuit and the coupling means, wherein the inductance of the inductive component is at least 4.7 times the inductance of the inductor; and which coupling means comprises a trigger circuit and an SCR having an anode lead, a cathode lead and a gate lead, the SCR being connected in series between the energy source and the inductor by the anode and cathode leads, and the trigger circuit being coupled to the SCR gate lead to forward bias the SCR in response to a turn-on control signal to transfer electrical energy through the inductor to the resonant circuit until current flow in the inductor essentially stops, whereupon the SCR ceases to conduct to decouple the energy source and resonant circuit.

2. An electrical circuit according to claim 1, wherein the inductance of the inductive component is from 4.7 to 25.0 times the inductance of the inductor.

3. An electrical circuit according to claim 2 wherein the inductance of the inductive component is about 6.0 times the inductance of the inductor.

4. An electrical circuit for producing a damped sinusoidal electromagnetic field, comprising an underdamped resonant circuit including an inductive component and a capacitive component connected in parallel with one another, which inductive component comprises a conductor for producing an electromagnetic field when current flows in the conductor;

a D.C. source connected in series with the resonant circuit for providing electrical energy to the resonant circuit;

an SCR connected in series with the resonant circuit and the D.C. source for enabling electrical energy transfer from the D.C. source to the resonant circuit when the SCR is in a conducting state;

triggering means connected to the SCR for intermittently triggering the SCR into conduction; and an inductor connected in series with the SCR, the resonant circuit and the D.C. source for transferring energy, upon conduction of the SCR, from the D.C. source to the resonant circuit, which inductor has an inductance sufficiently less than the inductance of the inductive component in the resonant circuit such that sufficient energy is stored in the resonant circuit at a sufficient rate to cause the current in the SCR to ultimately cease to thereby then enable damped sinusoidal oscillation in the resonant circuit, whereby upon oscillation in the resonant circuit a damped sinusoidal electromagnetic field is produced.

5. An electrical circuit according to claim 4, wherein the inductance of the inductive component is at least 4.7 times the inductance of the inductor.

6. An electrical circuit according to claim 5, wherein the inductance of the inductive component is from 4.7 to 25.0 times the inductance of the inductor.

7. An electrical circuit according to claim 6, wherein the inductance of the inductive component is 6.0 times the inductance of the inductor.

* * * * *